J. N. G. NESBIT.
HORSE POWER CALCULATOR AND RECORDER.
APPLICATION FILED FEB. 17, 1915. RENEWED DEC. 17, 1921.

1,407,352.

Patented Feb. 21, 1922.

J. N. G. NESBIT.
HORSE POWER CALCULATOR AND RECORDER.
APPLICATION FILED FEB. 17, 1915. RENEWED DEC. 17, 1921.

1,407,352.

Patented Feb. 21, 1922.

Inventor
Joseph N. G. Nesbit

Witnesses
Guy M. Spring
C. W. P. Newbold

By Richard B. Owen.
Attorney

UNITED STATES PATENT OFFICE.

JOSEPH N. G. NESBIT, OF ATLANTA, GEORGIA.

HORSEPOWER CALCULATOR AND RECORDER.

1,407,352.   Specification of Letters Patent.   Patented Feb. 21, 1922.

Application filed February 17, 1915, Serial No. 8,784. Renewed December 17, 1921. Serial No. 523,244.

*To all whom it may concern:*

Be it known that I, JOSEPH N. G. NESBIT, a citizen of the United States, residing at Atlanta, in the county of Fulton and State of Georgia, have invented certain new and useful Improvements in Horsepower Calculators and Recorders, of which the following is a specification.

This invention relates to a machine for mechanically determining the horse-power of prime movers and for indicating the horse-powers determined thereby.

As is well known to those versed in engineering, indicators have been long in use in connection with steam engines and other prime movers for graphically illustrating the expansion of steam or other motive fluid by means of an auxiliary cylinder attached at some appropriate point to the main steam or power cylinder permitting the force of expansion of the motive fluid to act against a light-moving piston to force the same against a delicate and accurately gaged spring whereby a light parallel-motion device is operated to mark the lines of pressure by a pencil on paper moved to and fro by a second cylinder which is actuated by the motion of the main piston within the engine-cylinder.

The indicator cards produced by this apparatus permit the horse-power of the engine to be determined from the area of the cards by the usual formula:

$$\text{Horse-power equals } \frac{P\,L\,A\,N}{33{,}000},$$

Where P equals the mean effective pressure in square inches; L, the length of stroke in feet; A, the area of cylinder in square inches; and N, the number of strokes or revolutions per minute. The mean effective pressure, P, is usually obtained by multiplying the scale of the spring by the quotient given by the area of the card as divided by the length of the card.

It will be well remembered by those accustomed to this calculation that an accurate determination of the horse-power demands particular measurements of the engine and the determination of the indicator card area by means of a planimeter or other device of a like nature as well as involving tedious calculations.

It is accordingly contemplated by this invention to substitute for the above described mental and manual processes, means mechanically effecting the desired result by a suitable automatic mechanism.

It is a further object to provide an automatic horse-power indicator of the type above described capable of application without material change to either condensing or non-condensing engines in which steam is the motive fluid, or in prime movers of other types and to indicate upon a suitable clock dial the horse-power for any given instant and to preserve a continuous record for the performance of the engine to which this mechanism may be attached, for any given period of time.

Objects of a more specific nature, but particularly allied to an invention including the above mentioned means, are to provide in connection with the indicator piston and spring of a customary variety, means mechanically multiplying the ordinates of pressure by what is termed the engine constant; means mechanically adding each such multiplication, of which there are a plurality for each stroke of the engine and means establishing electrical connections for recording the total as summed by the preceding means once for every revolution of the engine.

The above and additional objects which will become apparent as this explanatory description proceeds are accomplished by such means as are illustrated in the accompanying drawings, described in the following specification, and then more particularly pointed out in the claims which are appended hereto and form a part of this application.

With reference to the drawings, wherein there is illustrated the preferred embodiment of this invention as it is reduced to practice, and throughout the several views of which like characters of reference designate similar parts:

Figure 7 is also an enlarged view of a portion of Figure 1, showing in detail the electrical recording connections, Figures 8 and 9 similarly are views in detail of portions of Figure 7, Figures 11 and 12 are diagrammatic views of indicator cards for non-condensing and condensing engines respectively.

Figure 6:
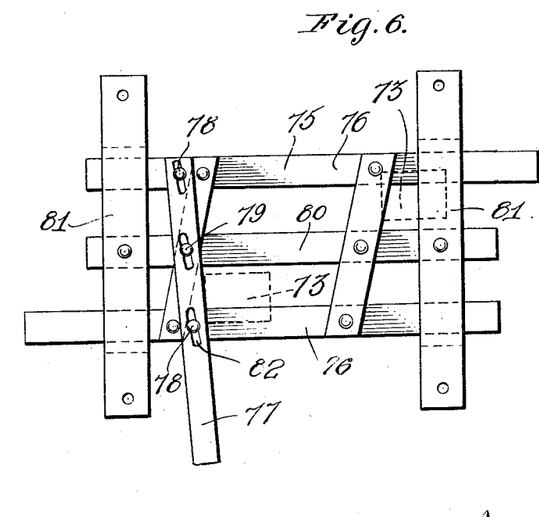
Figures 6, 7, 9, 11, 12:
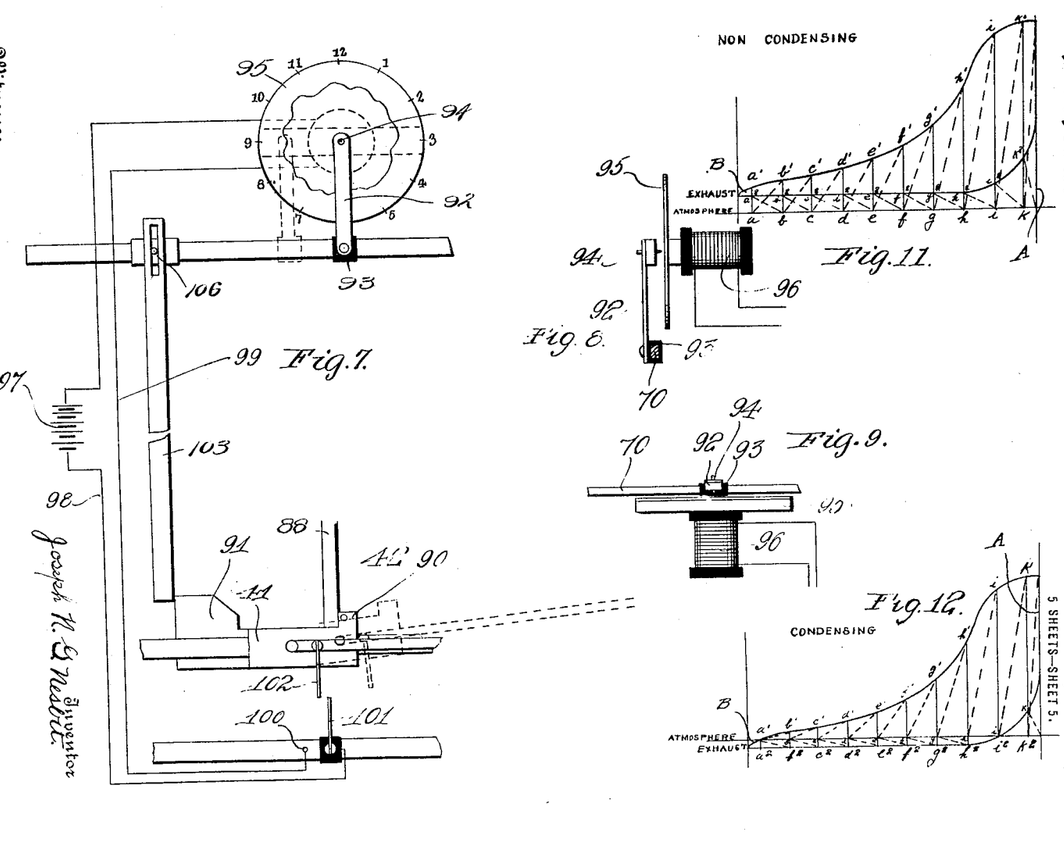
Figure 6A:
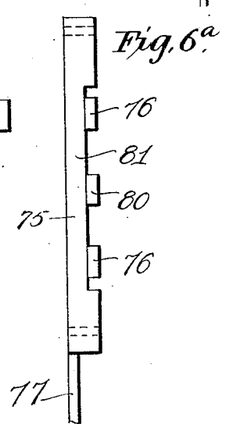

The basic idea of this invention depends upon a mechanical determination of the average ordinate of the indicator card as given by the expansion of the steam against the usual indicator piston and spring. Assuming that one such card such as illustrated in Figure 11 for a non-condensing engine is vertically subdivided by the ordinates $a$—$a'$, $b$—$b'$, $c$—$c'$, etc., it will be apparent that these ordinates will be given respectively and successively from the line of steam admission A to the exhaust point B if the indicator piston is permitted to react against the expanding pressure of the steam and is alternately forced down to its normal position (when acted upon only by the atmospheric pressure) before permitting the admitted steam enclosed in the engine cylinder by the cut off to expand from this abnormal compression along the line of the next following ordinate.

It should be apparent that the course of the indicator piston as the steam is alternately permitted to expand in its normal manner, in producing the customary lessening curve from $k'$ to $a'$, or is compressed; will be along the expansion line A upwardly, returning to the point $k$ by the dotted line in the compression stroke of the piston, then upward against the first ordinate of expansion $k$—$k'$ and so alternately downwardly by means of the dotted lines and upwardly on the ordinates of expansion. Mechanical means as will be hereinafter more fully described successively add these upward strokes by intermittently moving a common reciprocating bar so that the sum of such strokes may be ascertained, the average being found by reading the said sum to a one-tenth ($\frac{1}{10}$) scale since it is proposed to provide some ten (10) ordinates of expansion for each movement of the engine piston in one direction by affording ten (10) abnormal compression strokes along the above mentioned dotted lines to the indicator piston. Of course, it is to be understood that any number of ordinates may be provided for calculation purposes.

By providing means geared to the engine shaft at a ratio of 2 to 1 or any other suitable ratio, it will of course be possible to provide for the registering of a number of ordinates on each half stroke of the engine, those on the forward stroke being as already described from the atmospheric line $a$—$k$ to the expansion curve $a'$—$k'$ while those on the return stroke of the engine will be from the atmospheric line $a$—$k$ to the exhaust line $a^2$—$b^2$ which latter is connected with the expansion curve when the exhaust ports are opened as at B. In the case of the non-condensing engine these ordinates registered by the mechanism are of course to be subtracted from the ordinates given on the forward stroke in order to give the effective pressure, the mean of which is found as already described. In the case of the condensing engine the card of which is illustrated in Figure 12 the ordinates $a$—$a^2$, $b$—$b^2$, $c$—$c^2$, etc., are to be added to the first set of ordinates $k$—$k'$, $i$—$i'$, $h$—$h'$, etc., since in the case of engines of the latter character the exhaust is below the atmospheric pressure which must be included in the mean effective pressure.

It will be obvious from the foregoing that with the mean effective pressure thus determined to take the place of P in the formula $\frac{PLAN}{33,000}$, that it will be necessary to multiply this P both by the constant for the engine (the product of the length of the stroke by the area of the piston as divided by 33,000) and by the number of revolutions in order to obtain the horse-power for that given number of revolutions. Means mechanically effecting this multiplication are to be hereinafter disclosed so that the theory of this invention may be stated to multiply each ordinate of pressure in succession by $\frac{LAN}{33,000}$ and to add these successive products upon a bar which may be read to one-tenth ($\frac{1}{10}$) of the acquired sum in order to properly average the ordinates. This addition of ordinates $k$—$k'$, $i$—$i'$, $h$—$h'$, etc., is taken in one direction of the adding bar for the forward stroke of the engine while upon the return stroke of the engine there will be either subtracted or added (depending upon the noncondensing or condensing character of the engine) the ordinates $a$—$a^2$, $b$—$b^2$, $c$—$c^2$, etc., resulting in a further movement of the bar in one or the other direction and thereby accurately permitting the positioning of a pointer carried by the bar so that suitable electrical connections can be made against every stroke of the engine to record the final position.

Referring more particularly to the actual construction involved in a reduction of means accomplishing these theoretical purposes to practice, the numeral 15 designates a suitable framing including side bars and cross rods in which may be supported in any suitable manner with which this invention need not be particularly concerned, a shaft 16 adapted to be driven at the same rate of speed as the engine shaft, and in some instances of stationary engines may be the engine shaft itself. A gear 17 is mounted upon this shaft for engagement with the smaller gear 18 carried upon a stub shaft 19 parallel with the shaft 16 and carrying also the large gear 20 which meshes with gears 21 carried on stub shafts 22 suitably mounted in the framing 15 and having bearing disks 23 mounted upon their opposite extremities. The mentioned gears 18 and 20 serve the purpose of effecting a ratio of revolution between the disks 23 and shaft 16 of 2 to 1 five to one or any other suitable ratio so that means connected to these disks and revoluble therewith may operate once or two and one-half times to each half stroke of the engine as will be necessitated when desirably operating the ordinates.

Figure 1:
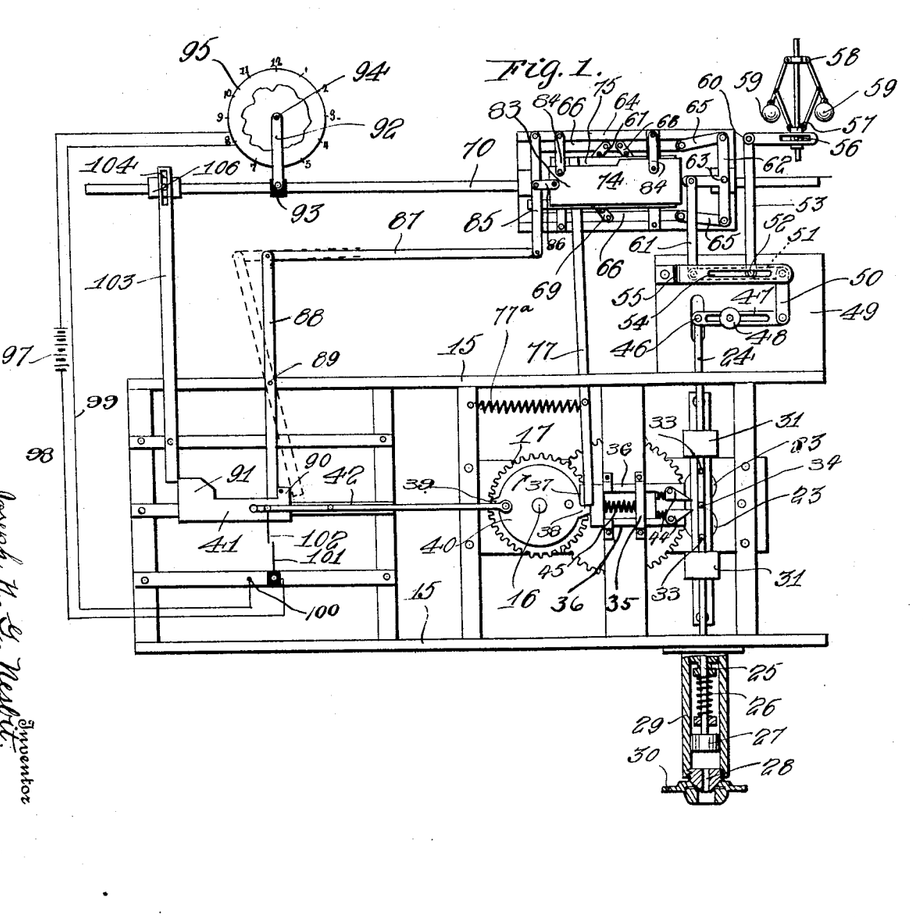
Figure 1 is a side elevational view of an arrangement of the means comprehended by this invention and accomplishing the objects thereof.
Figure 2:
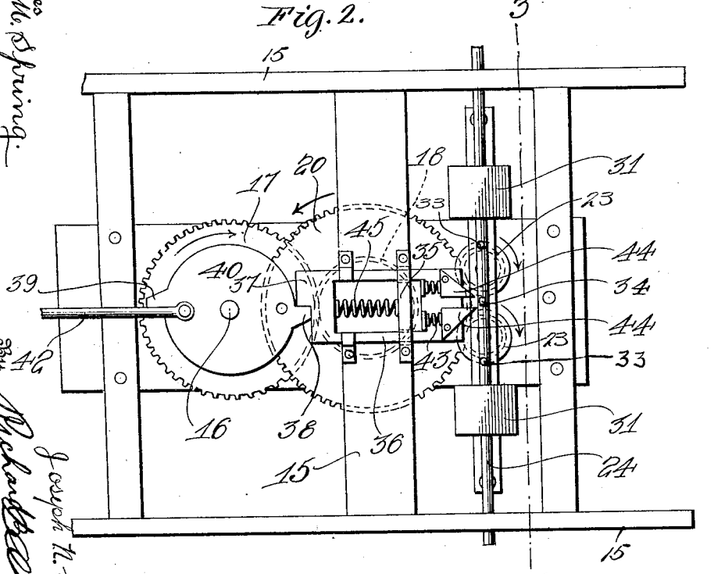
Figure 2 is an enlarged detail of a portion of Figure 1.
Figure 3:
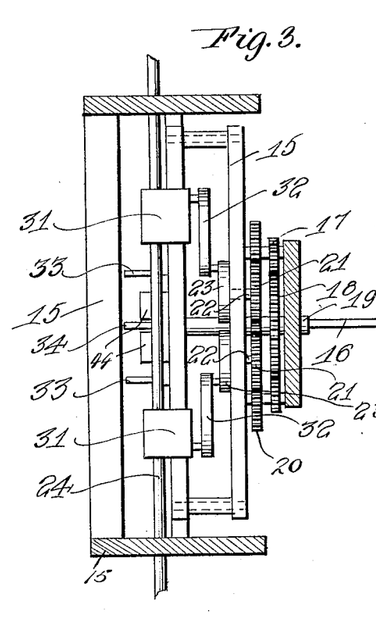
Figure 3 is a sectional view on the line 3—3 of Figure 2.

A bar 24 is mounted in suitable horizontal members of the framing 15 for vertical reciprocation therethrough, such bar being connected as clearly shown in Figure 1, with a piston rod 25 around which is placed the light and accurately gaged indicator spring 26 for acting upon the piston head 27, against the under face of which latter, steam is adapted to exert its expanding force when admitted through the nozzle 28, as the indicator casing 29, housing the beforementioned elements is connected by means 30 to the working cylinder of the steam engine to which the apparatus comprehended by this invention is attached. It may here be remarked that the preferred embodiment of the horse-power indicator and recorder of this invention is to be disclosed in connection with its applicability to steam engines, but it will be apparent that within the scope of this invention lie the adaptational means rendering this indicator and recorder applicable to prime movers in which some other motive fluid than steam is employed.

Slidable upon the ordinate rod 24 but independently thereof are the cross heads 31 oppositely connected by cranks 32 to the previously mentioned disks 23 and like them adapted to make a complete reciprocation two or five times as the case may be to each complete revolution of the shaft 16. These cross heads are used as a resetting means for the ordinate rod 24 and control movement of the same by means of pins 33 against which the cross heads contact in the manner to be hereinafter more fully set forth, these pins being on opposite sides of the center of the rod from a locking pin 34 positioned at such center.

Horizontally slidable through brackets 35 secured to one of the upright plates of the framing 15 is the rectangular carriage 36 formed at one extremity with an offset surface 37 adapted to coact with cams 38 or 39 carried by the disk 40 mounted on the main shaft 16 and rotating therewith as does also the cross head 41 connected by crank means 42 to the said disk 40. Upon the other extremity of the carriage 36 are resiliently mounted as at 43, a pair of triangular locking plates 44 which are normally maintained out of engagement with their coacting pin 34 by means of a central expansible spring 45 acting against one of the mounting brackets 35 in order to withdraw the plates 44 from a position of locking engagement with their pin until the carriage is actuated by one of the cams 38 or 39 against the tension of the spring to momentarily so lock the pin 34 and consequently the ordinate bar 24. It will be obvious that such locking engagement is adapted to occur once at every half revolution of the shaft 16 owing to the diametrically opposed positions of the actuating cams, the release edges of which are alined with the crank 42 when the latter is occupying its dead center position.

As brought out in the preliminary discussion, vertical movements of the bar 24 correspond graphically to the proper effective pressure which must be multiplied by the length of stroke of the engine, the area of the piston and the number of such strokes per minute, the whole product to be divided by 33,000. Since it is aimed to effect these operations of multiplication and division by mechanical means including variably fulcrumed levers, it will be apparent that the engine constant $\frac{L\,A}{33,000}$ should first be reduced to decimals in order to more readily provide a single factor to shorten these operations. Since this decimal is frequently in the ten-thousandths and since the number of revolutions of the engine, the other factor, is reversely, a large number, means have been provided whereby a cancellation of these two oppositely large numbers may be effected mechanically as will be more fully set forth in the operation to follow.

Pivotally connected at 46 to the uppermost extremity of the bar 24 is a slotted link 47 in the slot of which is movable a variable fulcruming point 48 of any obvious construction for shiftable arrangement with regard to the supporting plate 49. A vertical link 50 transmits movement of the outer extremity of this bar 47 to a similarly slotted link 51 which is fulcrumed upon a pin 52 of a bell crank 53, such pin also working in a slot 54 of a bracket 55 also secured to the supporting base 49 in order to maintain the fulcruming pin 52 in the adjusted position determined by the bell crank 53. This latter has its angled extremity also slotted to receive the pin 56 slidable therein and carried by the sleeve 57 of a governing device denoted mainly by the numeral 58, such device being provided with the usual balls 59, the movement of which determines the shifting of the bell crank 53 which is suitably pivoted as at 60.

Figure 4:
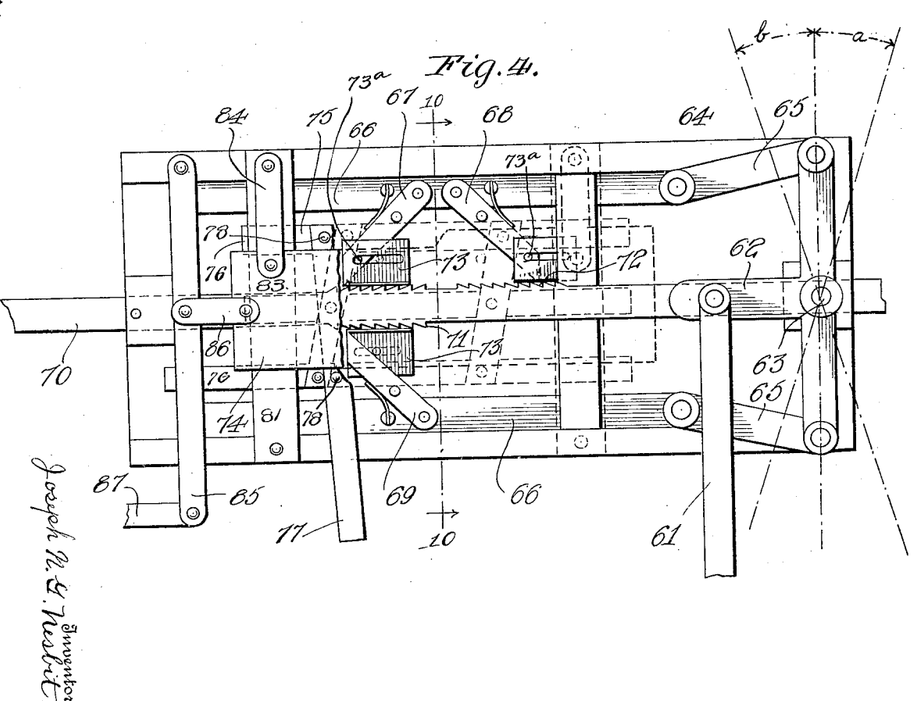
Figure 4 is also an enlarged detail of matter illustrated in Figure 1, parts being severally broken away, Figures 5, 6 and 6ᵃ are details of the shiftable means broken away in Figure 4.

The free end of the slotted link 51 is vertically and pivotally connected by means 61 to a T-bar 62, this latter being pivoted as at 63 to a framing 64 and having the vertical terminals of the T-portion pivoted by link connections 65 to horizontally slidable bars 66 which actuate in the manner most clearly shown in Figure 4, pawls respectively designated by the numerals 67, 68, and 69 for operation upon a bar 70 provided intermediately with suitable rack teeth 71 arranged on both edges for a portion of the bar length and inclined in one direction for operation thereupon by the pawls 67 and 69, while also arranged upon a portion of the bar spaced from the first said portion are oppositely inclined teeth 72 with which the pawl 68 is adapted to coact as will be presently set forth.

Figure 10:
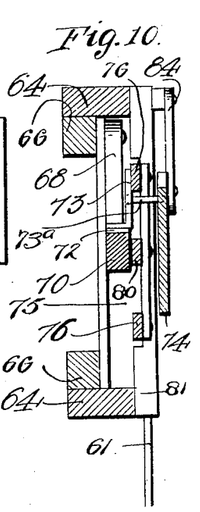
Figure 10 is a transverse sectional view on the line 10—10 of Figure 4, looking in the direction indicated by the arrow.

Since, as has been explained in connection with the previously presented theory of this invention each ordinate given by the expansion of the steam against the indicator piston is registered upon the rack bar, which serves to successively add such ordinates, such piston must again be pressed to its normal position as regards the atmospheric line of the expansion cards, before permitting the next ordinate of expansion to be registered upon the adding bar, so that some means must be provided to prevent the engagement of the pawls with this adding bar at certain times. This means includes stirrups 73 which are operable by a pair of shifting devices 74 and 75 as illustrated respectively in Figures 5 and 6. This latter device is in the nature of a gate having the parallel members 76 oppositely shiftable by means of a lever 77 pivoted to each bar at 78 and intermediately fulcrumed as at 79 upon a stationary bar 80 which is secured to the two vertical framing pieces 81 against which the parallel bars 76 are slidable. Each of these mentioned bars 76 carries one of the stirrups 73 and the whole device 75 is positioned adjacent the rack bar 70 in the manner clearly illustrated in Figure 10 so that the bars carrying the L-shaped stirrups may be interposed between the rack and the various pawls at certain desirable periods in the operation of the device by a longitudinal and shifting motion with respect to such bar 70. The pivotal and fulcrum points of the lever 77 are seated in suitable slots 82 in order to provide for a necessary up and down movement of this lever without vertically actuating the sliding gate 75, as will be hereinafter more fully explained. If desired the stirrups may be fixedly secured to the framing 64 and of such sizes that the various pawls will be disengaged thereby with the rack 70 according to the angular movement of the bar 62.

Figure 5:
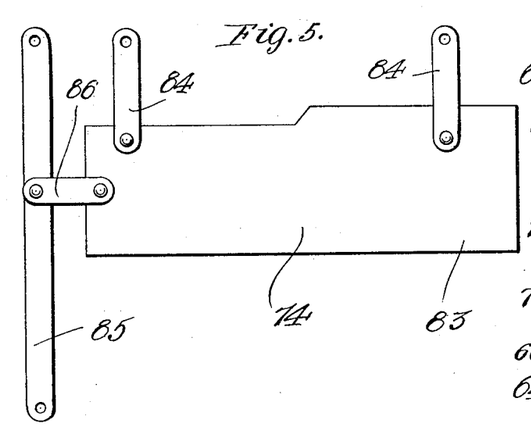

The shifting device 74 as illustrated in Figure 5 is seen to include the body plate 83 suspended from the frame members 64 by suitable parallel pivoting links 84 and being adapted to be actuated by the similarly pivoted lever 85 through the short link 86, said lever having link connections 87 with a second vertical lever 88 pivoted as indicated at 89 to a suitable portion of the frame 15 and extending below such pivoting point for a contacting relationship with the extensions 90 and 91 of the cross head 41 operative in conjunction with the engine shaft 16. Pins 73ª are carried by this plate 74 for operation in suitable slots of the stirrups 73 so that the movement of these latter can be controlled by either of said shifting devices, both being used for separate purposes.

The adding bar 70 is prolonged at each extremity to allow for the proper movements of addition and subtraction and carries adjacent one of these produced extremities an arm 92 mounted on suitable insulation 93 spacing the same from the bar and carrying at its head the metallic indicator point or tracing pencil 94 directed towards a dial 95 which as illustrated may be a rotatable clock dial provided with cross sectioned or indicator paper and which is supported concentrically with the solenoid 96. Electrical current for the proper actuation of the solenoid is supplied by a suitable source of difference of potential 97 through the conductors 98 and 99 forming a circuit including the said solenoid, one of said conductors being connected to the frame 15 as indicated at 100; the other of said conductors having electrical connection to a suitable point of contact 101 insulated from the said frame and stationary thereupon. A movable contact 102 adapted to automatically make connections with the said stationary contact is carried by the connecting rod 42 of the cross head 41 and at such a distance from the pivot of said connecting rod as to have a movement of which there is some small vertical component so that connection will be established between these contacts but once every revolution of the shaft 16 to close the circuit and actuate the solenoid 96 once for each of these revolutions as will be readily apparent from the dotted line showing of Figure 7, the movable contact missing contact 101 on the forward stroke and being just permitted to make connection at the completion of the return stroke of the connecting rod.

The cross head 41 carries as has been mentioned the extensions 90 and 91 the former actuating the lever 88. The extension 91 is enlarged to contact with the short end of a lever 103, the opposite extremity of which is slotted to loosely receive a pin 106 carried by a sleeve firmly secured to the adding bar 70 for which this lever acts as a resetting means once upon every revolution of the said connecting rod 42. It should be noticed that as illustrated in Figures 1 and 7 the contact 102 has passed the stationary contact when the extension 91 is in contact with this lever so it will be apparent that means are afforded for recording the position of the pointer 92 upon the dial before the adding bar carrying such pointer is reset to the line denoting atmospheric pressure.

The complete operation of the device may be set forth briefly as follows:

The casing 29 is connected with the working cylinder of the engine and steam from such cylinder is admitted in the usual manner to act against the piston 27 in order to actuate the bar 24 in the manner already mentioned. If we consider that the value of $\frac{LA}{33,000}$, the engine constant, to be some such quantity as .0135 and that the speed of the engine as indicated by the governor 58 is say, for example 100 revolution per minute, it will be remembered that it is necessary to cancel from each of these two factors, such common divisors as will enable us to represent quantities for each of these factors in the general multiplication such that they may be easily determined to scale, when set upon the various multiplying lever arms. To do this in the given case above cited the engine constant is multiplied by 100 so that it may be written as 1.35 and this factor of 100 is removed from the number of revolutions leaving this latter now 1 so that the product of the factors $\frac{LAN}{33,000}$ is in either case of this given example, 1.35, as a multiplier for the mean effective pressure determined by the rod 24, both of the new numbers being much easier to set out on the levers. When the speed of the governor 58 is 100 revolutions, the pin 52 is adapted to assume that position with the slot 54 such that movement of the right hand end of the bar 51 will be trebled upon the upright 61. Similarly, the fulcruming point 48 is to be shifted within the slotted link 47 and it is apparent that a scale may be used in conjunction with such point to enable it to be accurately set to the needed quantity such that the right hand end will multiply any force exerted by upward movement of the rod 24 by the factor 1.35 so that the whole movement of such rod will be multiplied upon the rod 61 by $\frac{LAN}{33,000}$.

The driving gears 17 and 18 provide for one reciprocation of the shaft 24 for each half stroke of the engine by means of the cross heads 31 loosely slidable upon the shaft and oppositely actuated by the cranks 32 to return the bar to position corresponding to the atmosphere line of the card after every displacement. Steam first admitted into the casing 29 forces the piston 27 upward on the usual admission line A of Figures 11 and 12 and such ordinate is multiplied by $\frac{LAN}{33,000}$ in the manner above set forth as regards the impulse thereby given to the bar 61 which in turn actuates the T-bar 62 through the angle $a$ as illustrated in Figure 4, exerting a pull upon the upper bar 66 such that pawls 67 and 68 do not engage with the rack, and exerting an equal push upon the lower bar 66 to drive the pawl 69 into contact with the bar 70 and to force this adding bar forward a distance commensurate with the said impulse, it being noted that leaf springs are thereby provided for each pawl to normally insure contact therebetween and the rod unless otherwise decreed by the position of the stirrups 73. Immediately after this initial admission impulse has been thus reported, the upper cross head 31 returns the bar 24 to its original position and again permits the steam compressed by this return movement to expand along the ordinate $k$—$k'$ and this result is repeated throughout the entire diminishing expansion effect of the steam during 1 revolution of the disks 23, or during one half revolution of the engine shaft 16.

At the completion of the first half revolution of this shaft the cam 39 has come in contact with the shiftable catch plate 36 and in the obvious manner has permitted the catches 44 to engage the locking pin 34 so that the bar 24 is held stationary. This cam also operates against the lever 77 to shift the pawl actuating device 75, so that before the return stroke of the engine corresponding to the exhaust line of the indicator cards, all of the pawls will be thrown out of engagement with the rack, although this condition merely lasts long enough, as determined by the action of a suitable spring 77$^a$ as illustrated in Figure 1 to permit the passage of the cam 39, such spring drawing the bar 77 back to its original position. While this movement of the pawl shifter 75 serves no purpose at the end of the first half revolution of the engine shift, it is necessary at the completion of the entire revolution for the reason that the bar 70 must be reset and all the pawls, accordingly, must be disengaged therewith. The bar 77 which is thus interposed in the path of the cams for actuation thereby at the completion of one revolution must necessarily be also actuated at every half revolution although at this latter time its working neither adds nor detracts from the proper operation of the machine.

The pawl shifter 74 while occupying the position illustrated in Figures 1 and 4 for the first half revolution of the engine shaft is now deflected by the enlarged portion 91 of the cross head 41 to occupy the dotted line position illustrated in the latter figure so that the stirrups 73 are shifted from right to left of this figure in permitting pawl 68 to actuate the rack and pawls 67 and 69 to be inoperative thereupon during the return stroke of the engine, the rod 61 still transmitting impulses of the multiplying mechanism and steam expansion to the T-bar 62 through the angle $a$. It will be apparent that the motion thus given by the pawl 68 to the adding bar is a motion of subtraction from the amount formerly totaled by the expansion ordinates in order to arrive at the true determination of the actual power ordinates of the engine. The immediately preceding description is true, of course, only in the case of a non-condensing engine which operates the T-bar always through the angle $a$. In the case of a condensing engine the exhaust is below the line of atmospheric pressure, here corresponding to the vertical line bisecting the combined angles $a$ plus $b$ of Figure 4, and, accordingly the bar 61 is downwardly actuated upon the return stroke of such an engine moving the T-bar through the angle $b$ thus affording a push and pull to the upper and lower bars 66 respectively and thus permitting the pawl 67 to add upon the bar 70 the new amounts in place of subtracting them therefrom.

The process of algebraically adding the exhaust strokes is continued through a like number of ordinates as characterized in the primary addition upon the bar 70 and at the completion of the engine's return stroke, contact is made as previously mentioned between the respectively fixed and movable contacts 101 and 102 so that the circuit is closed to actuate the solenoid 96 whereby the final position of the pointer 94 carried by the adding bar is recorded upon the clock dial face 95. Since this latter revolves and is covered with a suitable cross section paper, it is readily apparent that a graphical illustration may be made for a continuous run of the engine as is indicated by the broken line shown upon this clock dial face in Figures 1 and 7, the pointer 94 normally occupying a position opposite the center of the dial before primary actuation of the bar and being reset to this position by the previously described lever 103 controlled by the cross head enlargement 91 at the completion of the engine stroke.

From the foregoing, it should therefore be apparent that means have been disclosed whereby the objects previously presented are capable of being accomplished, so that this invention may therefore be claimed as possessing the advantages and desirability set forth in such objects.

While in the foregoing however, there has thus been illustrated in the drawings, and described in the specification such combination and arrangement of elements as constitute the preferred embodiment of this invention, it is desired to emphasize the fact that such minor changes in the matters of proportion and degree may be made in later adaptations of this device as shall not alter the spirit of the invention as defined in the appended claims.

What is claimed is:—

1. Means, in combination with an indicator-piston rod for prime movers, adapted to multiply movement of said piston rod by the engine constant and the number of revolutions per minute of said prime mover, in mechanically determining the horse-power of said prime mover, and pawl and rack means for the addition or subtraction of the complete strokes of said piston.

2. Means, in combination with the indicator-piston rod of a prime mover, adapted to multiply movement of said piston rod by the engine constant and the number of revolutions per minute of said prime mover, of means both manually and automatically actuated, for adjusting the multiplying means in mechanically determining the horse-power of the prime mover, and pawl and rack means for the addition or subtraction of the strokes of said piston rod.

3. Means, in combination with the indicator-piston of a prime mover, for multiplying movement of said piston by the engine constant and the number of revolutions per minute of said prime mover, of means for arranging the said first means to cancel out opposed factors in said multiplier in more easily determining mechanically the horse-power of the prime mover, and pawl and rack means for the mechanical addition or subtraction of the strokes of said piston-rod.

4. Means, in combination with the indicator piston of a prime mover, adapted to multiply movement of said piston by the engine constant and by the number of revolutions per minute of said prime mover, of means for canceling out from said multipliers opposed factors in facilitating the multiplying process, means for adjusting the first said means to suit varying conditions when mechanically determining the horse-power of prime movers, and pawl and rack means for adding or subtracting the strokes of said piston.

5. Means, in combination with an indicator piston for prime movers, adapted to multiply the ordinates of expansion of the motive fluid of said prime mover by the engine constant and the number of revolutions per minute of said prime mover to simultaneously and mechanically determining the horse-power of the latter, and pawl and rack means for the addition or subtraction of said ordinates.

6. Means, in combination with the indicator piston for a prime mover, adapted to multiply the ordinates of expansion of the motive fluid of said prime mover by the engine constant and by the number of revolutions per minute of said prime mover, a pawl and rack mechanism for the addition or subtraction of said ordinates, and means for adjusting said first means in mechanically determining the horse-power of the prime mover.

7. Means, in combination with the indicator piston of a prime mover, for multiplying the ordinates of expansion of the motive fluid of said prime mover by the engine constant and the number of revolutions per minute of said prime mover, means for automatically adding or subtracting said ordinates, and means for arranging said first means to cancel out opposed factors in said multiplier in more easily determining, mechanically, the horse-power of the prime mover.

8. Means, in combination with the indicator piston of a prime mover, for multiplying successive ordinates of expansion of the motive fluid of said prime mover by the engine constant and the number of revolutions per minute of said prime mover, means for automatically adding or subtracting mechanically the said ordinates, means for canceling equal opposed factors in facilitating the multiplying process, and means for adjusting the said first means when mechanically determining the horse-power of the prime mover.

9. Means, in combination with the indicator piston of a prime mover, for multiplying successive ordinates of expansion of the motive fluid of said prime mover by the engine constant and the number of revolutions per minute of the prime mover longitudinally movable means for the addition or subtraction of said ordinates, and means for recompressing said motive fluid through direct operation of said piston to obtain a reexpansion of the former from the starting point when mechanically determining the horse-power of the said prime mover.

10. Means, in combination with the indicator piston of a prime mover, for multiplying successive ordinates of expansion of the motive fluid of said prime mover by the engine constant and the number of revolutions per minute of the prime mover, a longitudinally movable member, connections between the latter and said indicator-piston to operate said member and add or subtract said ordinates, means for recompressing said motive fluid through direct operation of said piston to obtain a reexpansion of said fluid from the point of atmospheric pressure, and means for adjusting the said first means in mechanically determining the horse-power of the prime mover.

11. Means, in combination with the indicator piston of a prime mover, for multiplying successive ordinates of expansion of the motive fluid by the engine constant and the number of revolutions per minute, a rack bar, connections between said rack bar and the piston to mechanically operate the former for the addition or subtraction of said ordinates, means for recompressing said motive fluid to obtain a reexpansion thereof from the point of atmospheric pressure, and means for arranging first said means to cancel out opposed factors in said multipliers in more readily determining, mechanically, the horse-power of the prime mover.

12. Means, in combination with the indicator piston of a prime mover, for multiplying successive ordinates of expansion of the motive fluid by the engine constant and the number of revolutions per minute, a pawl and rack mechanism operable in either direction, means for operating said mechanism from said indicator-piston for the addition or subtraction of said ordinate, means for recompressing said motive fluid to obtain further expansion ordinates, means for canceling equal opposed factors in facilitating the multiplying process, and means for adjusting the first said means in varying the multiplying process when mechanically determining the horse-power of the prime mover.

13. Means, in combination with the indicator piston of a prime mover, for multiplying successive ordinates of expansion of the motive fluid of said prime mover by the engine constant and the number of revolutions per minute, rack means for the addition of said successive ordinates, and pawls operative upon said rack means to add the ordinates or subtract the same thereupon.

14. Means, in combination with the indicator piston of a prime mover, for multiplying successive ordinates of expansion of the motive fluid for said prime mover by the engine constant and the number of revolutions per minute, means for recompressing said motive fluid to obtain a plurality of further expansion ordinates to each half revolution of said prime mover, rack means for the addition of said ordinates, and pawls operative upon said rack to add the ordinates or subtract the same thereupon according to the particular half revolution and the character of prime mover.

15. Means, in combination with the indicator piston of a prime mover, for multiplying successive ordinates of expansion of the motive fluid for said prime mover by the engine constant and the number of revolutions per minute, means for recompressing said fluid to obtain a plurality of further expansion ordinates to each half revolution of said prime mover, rack means for the addition of said ordinates, pawls operative upon said rack to control movement of the same with regard to said successive multiplied products, and means for reading the final position of said rack to a scale having the ratio of unity to the number representing the said plurality of further expansion ordinates.

16. Means, in combination with the indicator piston of a prime mover, for multiplying successive ordinates of expansion of the motive fluid for said prime mover by the engine constant and the number of revolutions per minute, means for recompressing said motive fluid to obtain a plurality of further expansion ordinates to each half revolution of said prime mover, rack means, pawls operable thereupon to record such products thereupon, an indicator arm carried by said rack, a pointer carried by said arm, and means for recording the position of said arm by means of said pointer at the completion of each revolution of said prime mover.

17. Means, in combination with the indicator piston of a prime mover, for multiplying successive ordinates of expansion of the motive fluid for said prime mover by the engine constant and the number of revolutions per minute, means for recompressing said motive fluid to obtain a plurality of further expansion ordinates to each half revolution of said prime mover, rack means, pawls operable upon said rack to record the products thereupon, an indicator arm carried by said rack, a pointer on said arm, means recording the final position of said pointer at the completion of each revolution of said prime mover, and means for resetting said rack immediately after the recording process.

18. Means, in combination with the indicator piston of a prime mover, for multiplying successive ordinates of expansion of the motive fluid of said prime mover by the engine constant and the number of revolutions per minute, means for recompressing said motive fluid to obtain further expansion ordinates, rack means, pawls normally operable upon said means, pawl shifting devices, stirrups carried thereby to interpose between said pawls in turn and said rack in permitting certain pawls only to operate upon the latter in recording thereupon the said products according to the particular half revolution and the character of prime mover, and means for resetting such rack.

19. Means, in combination with the indicator piston of a prime mover, for multiplying successive ordinates of expansion of the motive fluid of said prime mover by the engine constant and the number of revolutions per minute, means for recompressing said motive fluid to obtain further expansion ordinates, rack means, pawls normally operable upon said rack, pawl shifting devices, stirrups carried by said devices to interpose between said pawls and said rack in permitting certain pawls only to actuate said rack to record thereupon the said products, and pivoted levers connected to said devices and operable by adjuncts of the prime mover at each half revolution of the latter.

20. Means, in combination with the indicator piston of a prime mover, for multiplying successive ordinates of expansion of the motive fluid of said prime mover by the engine constant and the number of revolutions per minute, means for recompressing said motive fluid to obtain a plurality of further expansion ordinates, rack means, pawls engageable with said rack, means operatively connecting said pawls with said multiplying means to drive said rack in accordance with the products of the latter, indicator means carried by said rack, shiftable means operable by movable adjuncts of the prime mover to direct the actions of certain of said pawls at a time, a revolving dial face for use in conjunction with said indicator, an electric circuit, means operable by said movable adjuncts to close said circuit at the completion of each full revolution of said prime mover to note the final position of said indicator with respect to said dial, and means for resetting said rack after each determination of the horse-power.

21. Means, in combination with the indicator-piston and main shaft of the prime mover, for multiplying successive ordinates of expansion of the motive fluid for said prime mover by the engine constant and the number of revolutions per minute, means for recompressing said motive fluid to obtain a plurality of further expansion ordinates to each half revolution of said prime mover, rack means, pawls operable thereupon to record such products thereon, an indicator arm carried by said rack a pointer carried by said arm, means for recording the position of said arm by means of said pointer at the completion of each revolution of said prime mover, means controlled by said main shaft to throw said pawls to inoperative position, and means to return said rack means to normal position.

22. Means, in combination with the indicator-piston and main shaft of a prime mover, for multiplying successive ordinates of expansion of the motive fluid for said prime mover by the engine constant and the number of revolutions per minute, means for recompressing said motive fluid to obtain a plurality of further expansion ordinates to each half revolution of said prime mover, a longitudinally movable member for the addition of said ordinates, mechanism operative upon said member to cause a step by step movement of the same and thereby add the ordinates or subtract the same thereupon according to the particular half revolution and the character of prime mover, means for automatically moving said mechanism to inoperative position at the completion of each half revolution of said prime mover, and means controlled by said main shaft to return said member to normal position at the end of each complete revolution of said prime mover.

23. Means, in combination with the indicator-piston and main shaft of a prime mover, for multiplying successive ordinates of expansion of the motive fluid for said prime mover by the engine constant and the number of revolutions per minute, means for recompressing said motive fluid to obtain a plurality of further expansion ordinates to each half revolution of said prime mover, means for momentarily locking said piston in normal position at the end of each half revolution of said main shaft, a longitudinally movable member, means for operating said member according to movement of said piston to add or subtract said ordinates of expansion of the motive fluid, means controlled by said main shaft for moving the last mentioned means to inoperative position at times, means for recording the position of said longitudinally movable member, and means controlled by said main shaft for returning said longitudinally member to normal position when released at the end of each revolution of said prime mover.

In testimony whereof I affix my signature in presence of two witnesses.

JOSEPH N. G. NESBIT.

Witnesses:
J. H. SCHROEDER,
T. L. JOHNSON.